United States Patent [19]

Yamane et al.

[11] Patent Number: 5,217,624
[45] Date of Patent: Jun. 8, 1993

[54] METHOD FOR THE DISPOSAL OF AQUEOUS SEWAGE SLUDGE

[75] Inventors: Isao Yamane; Toru Saito; Masao Shimoda; Satoshi Kouchi, all of Tokyo, Japan

[73] Assignees: Onoda Cement Co., Ltd.; Onoda Chemico Co., Ltd., Japan

[21] Appl. No.: 918,935

[22] Filed: Jul. 22, 1992

Related U.S. Application Data

[63] Continuation of Ser. No. 575,139, Aug. 29, 1990, abandoned.

[30] Foreign Application Priority Data

Sep. 11, 1989 [JP] Japan .................................. 1-232733

[51] Int. Cl.$^5$ ...................... B01D 43/00; B01D 46/00
[52] U.S. Cl. ........................................ 210/751; 55/97; 106/624; 106/724; 110/341; 110/345; 210/769; 210/770; 432/1
[58] Field of Search ............... 210/609, 710, 711, 751, 210/769, 770, 188, 205; 106/624, 724, 745; 110/246, 341; 432/1, 14; 55/341.1, 1, 97; 203/14

[56] References Cited

U.S. PATENT DOCUMENTS

| | | | |
|---|---|---|---|
| 3,963,471 | 6/1976 | Hampton | 210/710 |
| 4,039,649 | 8/1977 | Alagy et al. | 210/711 |
| 4,270,279 | 6/1981 | Roediger | 210/609 |
| 4,295,972 | 10/1981 | Kamei | 210/710 |
| 4,369,194 | 1/1983 | Arsovic | 210/609 |
| 4,640,681 | 2/1987 | Steinbiss et al. | 106/745 |
| 4,761,182 | 8/1988 | Whitescarver et al. | 210/751 |
| 4,895,665 | 1/1990 | Colelli et al. | 210/710 |
| 4,919,722 | 4/1990 | Trivino Vazquez et al. | 106/697 |
| 4,997,572 | 3/1991 | Wurtz | 210/710 |

FOREIGN PATENT DOCUMENTS

| | | |
|---|---|---|
| 124038 | 11/1984 | European Pat. Off. . |
| 141932 | 5/1985 | European Pat. Off. . |
| 162215 | 11/1985 | European Pat. Off. . |
| 2917123 | 11/1979 | Fed. Rep. of Germany . |
| 3542004 | 6/1987 | Fed. Rep. of Germany . |
| 2282407 | 3/1976 | France . |

Primary Examiner—Mary Lynn Theisen
Assistant Examiner—Sun Uk Kim
Attorney, Agent, or Firm—Jordan B. Bierman

[57] ABSTRACT

A combination of a dehydration process for dehydrating sewage sludge by mixing a quicklime-containing material with the sludge, a cement conversion process for introducing the solids produced by the dehydration process into a cement kiln with other cement raw materials to yield cement, and a gas treatment process for introducing gases generated in the dehydration process into a cement burning process, thereby enabling conversion of the sewage sludge into cement without releasing wastes, with a reduction in fuel consumption for the cement burning, and a reduction in NOx content of the exhaust gas.

15 Claims, 1 Drawing Sheet

METHOD FOR THE DISPOSAL OF AQUEOUS SEWAGE SLUDGE

This application is a continuation of application Ser. No. 07/575,139 filed Aug. 29, 1990, now abandoned.

BACKGROUND OF THE INVENTION

This invention relates to a system for disposal of aqueous sewage sludge by using it to make cement. Recently, amounts of sewage sludge released mainly from waste water treatment plants are increasing year by year, and are being treated by various processes.

For example, sewage sludge is mixed with fermentation auxiliaries, such as rice hulls and saw dust, and subjected to fermentation to produce compost. This compost is used for farmland, but its consumption is limited in quantity, and it is difficult to consume and reduce large amounts of compost.

Another method is to throw untreated sewage sludge into the seas. But regulations are gradually becoming stricter and this method is not desirable in view of the need for protection of the environment. Another method is to spread the sludge on farmland expecting fertilizing effects, but it is difficult to dispose of large amounts by this method.

Untreated sewage sludge is used in land reclamation, or sewage sludge is solidified with a solidification agent such as cement or lime and used in reclamation. However, it is becoming difficult year by year to find lands to be reclaimed; thus limiting the disposable amounts.

Sewage sludge has been burned in order to reduce the volume. However, this method releases large amounts of ash, which are usually disposed of by reclamation and hence the disposable amounts are limited. Part of the ash is used in architectural and horticultural materials, but amounts of consumption in these areas are also limited. Furthermore, this method has the inherent problem of high combustion costs.

SUMMARY OF THE INVENTION

With a view to these prior art problems, it is a primary object of the present invention to provide a system for utilizing sewage sludge in a manner which can efficiently treat large amounts thereof.

In accordance with the present invention which attains the above object, there is provided a system for utilizing sewage sludge comprising a combination of a dehydration process for dehydrating the sewage sludge by mixing a quicklime-containing material, a cement conversion process for putting solids released from the dehydration process in a cement kiln with other cement-forming raw materials to yield cement, and a gas treatment process for introducing gases released from the dehydration process into a cement burning process.

DETAILED DESCRIPTION OF THE INVENTION

Figure 1:
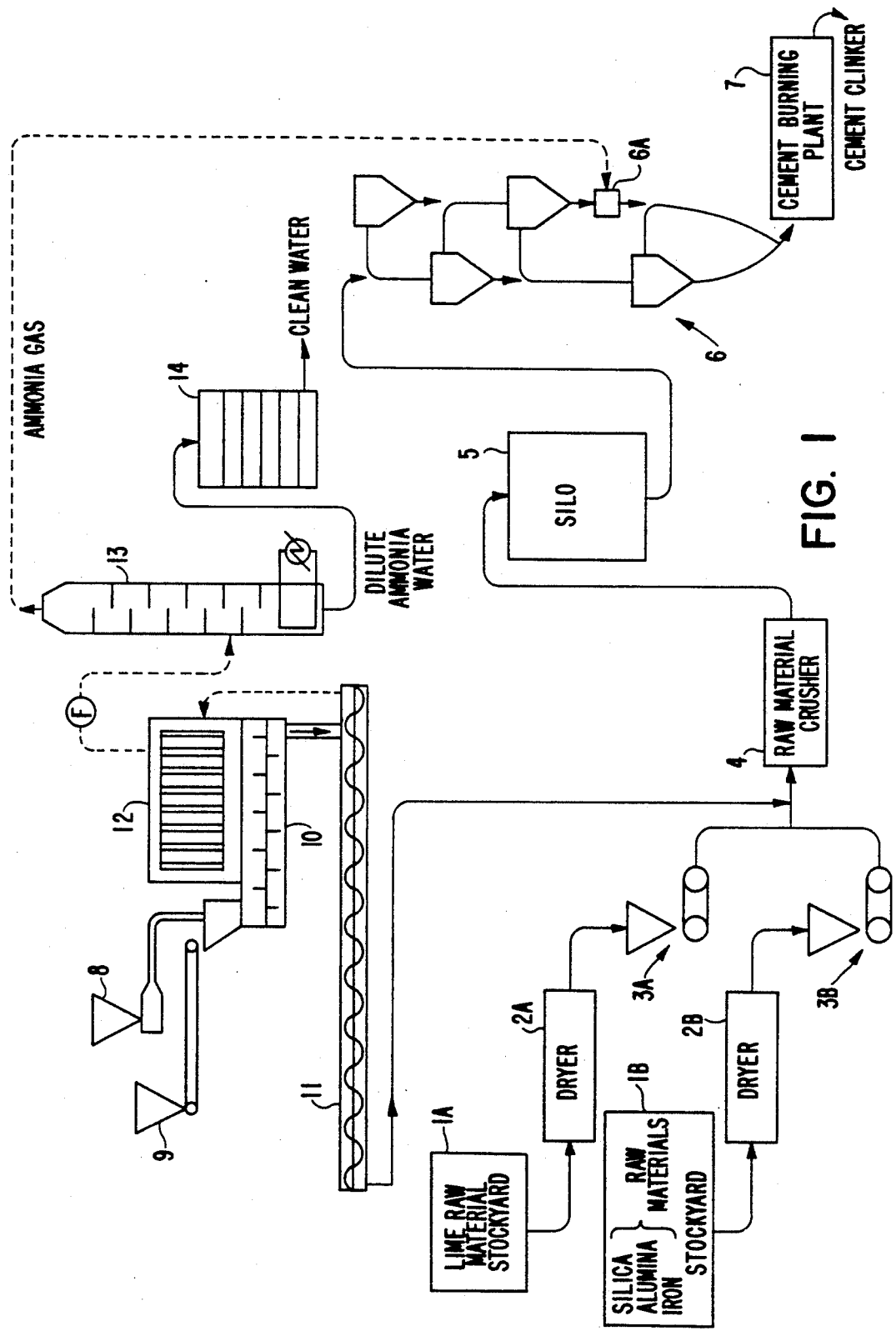
FIG. 1 is a diagram showing a cement burning process in an embodiment of the present invention.

Sewage sludge in the present invention means sludge released mainly from sewage treatment plants, and includes sludges released from treatment of raw sewage, home waste water, and industrial waste water. Water contents of these sludges are normally 60% or more.

The quicklime-containing material to be mixed with sewage sludge in the present invention comprises CaO which reacts with the water in the sewage sludge to produce slaked lime. Specifically, the quicklime-containing material includes quicklime, calcined dolomite, granulated slag, and blast furnace slag and contains at least 30% CaO, preferably at least 70%; other constituents may also be present if they do not interfere with the production of cement. The quicklime-containing material has a particle diameter of 70 mm or less, preferably 30 mm or less.

In the present invention, the ratio of sewage sludge to the quicklime-containing material is not specifically limited, however, since it is necessary to dehydrate the sewage sludge by mixing to produce solids which can be converted into cement in the subsequent process, the ratio of quicklime-containing material/sewage sludge is typically 1.5 to 0.5, preferably 1 to 0.7. Mixing is accomplished by mechanical agitation using a paddle mixer, pug mill, or the like, at a rotational speed of 10 to 80 rpm, preferably 20 to 50 rpm, and for a mixing time of 1 to 30 minutes, preferably 3 to 20 minutes.

When sewage sludge is mixed with the quicklime-containing material, water in the sewage sludge reacts therewith to yield slaked lime. Therefore, the solids, containing 20% or less of water, produced by the dehydration process comprise slaked lime and the solid constituents of the sewage sludge.

In the present invention, the solids produced by the dehydration process are then converted into cement. Specifically, the solids are put into a cement-forming raw material handling system such as a dryer or a mill at a cement plant. Then, in the cement kiln, the slaked lime and inorganic substances in the solid constituents of the sludge become the raw materials of the cement, and organic substances in the solid constituents of the sludge become fuel for cement burning.

However, the dehydration process releases malodorous gases such as ammonia ($NH_3$) which are treated by introducing them into the cement burning process. These gases are generated together with dust, which is mainly slaked lime fine powder, and water vapor which has adverse effects on cement burning in a dry process. Therefore, it is desirable that such fine powder be removed as by a bag filter or the like and water vapor be removed as by a distillation column or the like. Thereafter, the result is introduced by way of a rear port of the cement kiln, into the cement burning process. This decomposes the malodorous gases and, in particular, denitration occurs due to the ammonia. Water vapor is collected as drain water from the distillation column. When the drain water is dilute ammonia water, it is neutralized and then discharged.

As described above, the present invention can treat sewage sludge entirely in the cement plant and does not release any wastes. Furthermore, organic substances in the sludge can be utilized as a fuel, thereby supplying heat for cement burning and reducing the $NO_x$ content of the cement kiln exhaust gas.

Cement types that can be produced by cement burning to which the present invention is applied are not specifically limited and include Portland cement and alumina cement. The ratio of the sludge that can be utilized is also not specifically limited. When the amount of the sludge solid constituents is 30 weight % or less based on the total amount of the cement-forming raw materials, the sludge can be treated with no adverse effects on the properties of the resulting cement.

DESCRIPTION OF THE PREFERRED EMBODIMENTS

The present invention will now be described with reference to the embodiments.

FIG. 1 shows a cement burning process in a cement plant to which the present invention is applied. Referring to FIG. 1, lime raw material stored in a stockyard 1A and silica, alumina, and iron-based raw materials stored in a stockyard 1B are respectively introduced into raw material crusher 4 through dryers 2A and 2B and feeders 3A and 3B. These raw materials are crushed in raw material crusher 4, introduced into raw material silo 5, preheated by raw material preheater 6, and then fired in cement burning kiln 7 into cement clinkers. The above procedure is the same as that in ordinary cement production plants.

Sewage sludge and a quicklime-based material are respectively introduced from hoppers 8 and 9 into mixer 10, which is a paddle mixer. The sewage sludge and quicklime-based material are reacted in mixer 10 at an agitation speed of 30 rpm, and the resulting solids are transferred by ager/carrier 11 to raw material crusher 4. Water vapor generated from mixer 10 is passed through bag filter 12 to collect dust such as slaked lime, and the remaining water vapor is introduced into distillation column 13. Water vapor is removed by distillation column 13, and remaining gases, which mainly comprise ammonia, are introduced into calcining furnace 6a. Dilute ammonia water released from distillation column 13 is neutralized in neutralization tank 14 and discharged as clean water.

Using the above-described procedure, the following experimental operations were carried out. This cement plant operates 24 hours a day using 3,000 tons/day (lime-containing raw materials are approximately 80% of the input) to produce 2,000 tons/day of cement.

EXAMPLE 1

Sewage sludge containing 78% water from hopper 8 and quicklime of 30 mm or less in particle size from hopper 9 were introduced at rates of 5 tons/hour (120 tons/day) and 5 tons/hour (120 tons/day), respectively, into mixer 10. Solids produced by mixer 10 were charged into raw material crusher 4 through ager/carrier 11. During this operation, the amount of limestone in the cement-forming raw materials was reduced by 9 tons per hour. Furthermore, heat of 2.75 million Kcal per hour was produced from organic substances contained in the solid components of the sewage sludge.

20,000 ppm of $NH_3$ gas was detected in the water vapor released from mixer 10. This water vapor was passed through bag filter 12 to distillation column 13, and the resulting gases (mainly comprising ammonia) were fed to cement burning kiln 7 through its rear port. As a result, the $NO_x$ content of the exhaust gas was decreased from an average of 400 ppm to an average of 300 ppm, thereby facilitating $NO_x$ reduction treatment. Distillation column 13 released 0.04% dilute ammonia water, which was diluted with sulfuric acid in the neutralization tank 14 and then discharged.

EXAMPLE 2

A similar operation was carried out with sewage sludge containing 78% water at a feed rate of 10 tons/hour, quicklime at a feed rate of 10 tons/hour, and a decrease in limestone amount of 18 tons/hour in the cement-forming raw materials. As a result, heat of 5.5 million Kcal was produced from organic substances contained in the solid components of the sewage sludge. Furthermore, the $NO_x$ content of the exhaust gas was reduced from an average of 400 ppm to an average of 200 ppm.

Cement produced in accordance with Examples 1 and 2 had the same properties as ordinary cement.

Needless to say, solids obtained in the dehydration process are fed to raw material crusher 4 in the above-described Examples, but these may be introduced into the lime-containing raw material in stockyard 1A or dryer 2A.

As described above, the present invention converts sewage sludge into cement without releasing wastes, and reduces the amount of fuel needed for cement burning and the $NO_x$ content of the exhaust gas.

What is claimed is:

1. A method for the disposal of aqueous sewage sludge, consisting essentially of water and organic substances, said method comprising;
   dehydration of said sludge by mixing with a quick lime-containing material to form solids and a gas, said gas containing ammonia and water vapor,
   conversion of said solids to cement by heating with additional cement-forming raw materials, there being a maximum of 30 percent of said solids based on the total amount of said cement-forming raw materials,
   separation of said water vapor from said gas, and reintroduction of said gas in said heating step.

2. The method of claim 1 wherein said quicklime-containing material is selected from the group consisting of quicklime, calcined dolomite, granulated slag, blast furnace slag, and mixtures thereof.

3. The method of claim 2 wherein the weight ratio of said quicklime-containing material to said sewage sludge is 1.5 to 0.5.

4. The method of claim 2 wherein said solids contain a maximum of 20% by weight of water.

5. The method of claim 1 wherein said quicklime-containing material contains at least 30% by weight of CaO.

6. The method of claim 5 wherein the weight ratio of said quicklime-containing material to said sewage sludge is 1.5 to 0.5.

7. The method of claim 5 wherein said solids contain a maximum of 20% by weight of water.

8. The method of claim 1 wherein said quicklime-containing material has a particle diameter not exceeding 70 mm, preferably not exceeding 30 mm.

9. The method of claim 8 wherein the weight ratio of said quicklime-containing material to said sewage sludge is 1.5 to 0.5.

10. The method of claim 8 wherein said solids contain a maximum of 20% by weight of water.

11. The method of claim 1 wherein the ratio of said quicklime-containing material/sewage sludge is 1.5 to 0.5.

12. The method of claim 1 wherein mixing of said sewage sludge with said quicklime-containing material is by a paddle mixer or a pug mill.

13. The method of claim 1 wherein said solids contain a maximum of 20% by weight of water.

14. The method of claim 1 wherein said gas is mixed with quicklime fines, filtered to remove said fines, and distilled to remove said water vapor.

15. The method of claim 14 wherein a bag filter is used to remove said fines.

* * * * *